Oct. 29, 1935.  F. SCHAEFER  2,019,100

BRAKE BEAM SUPPORT

Filed Jan. 17, 1935

WITNESSES
A.B.Wallace.
V.A.Peckham.

INVENTOR
Frederic Schaefer
By
Brown, Critchlow & Flick
his Attorneys.

Patented Oct. 29, 1935

2,019,100

UNITED STATES PATENT OFFICE 2,019,100

BRAKE BEAM SUPPORT

Frederic Schaefer, Pittsburgh, Pa.

Application January 17, 1935, Serial No. 2,235

3 Claims. (Cl. 188—209)

This invention relates to brake beam supports for railway car trucks.

Many of the railway car truck frames now in use are provided with integral laterally projecting brake hanger brackets each of which has three horizontally-spaced recesses formed therein and opening at the bottom of the bracket. The inner and outer recesses are intended for receiving the bearing eyes of a U-shape brake hanger, the bearing eyes being pivotally mounted on a pin that extends through the walls of the recesses. The center recess is merely for saving metal.

In this type of hanger bracket the outermost recess is narrower than the others, it being but slightly wider than the thickness of a side-arm of a standard brake hanger. Consequently the width of the bearing eye that can be disposed in the outer recess of the bracket is limited to substantially the thickness of the side-arm, and it has been found in practice that the area of such an eye's bearing surface which engages the supporting pin is so inadequate that the eye and the pin wear rapidly. This results in expense of frequent inspections and replacements, and increased danger of the brake beam dropping onto the track and derailing the car.

The object of the invention is to provide a brake beam support for truck frames of the type described which is dependable and durable.

Figure 1:
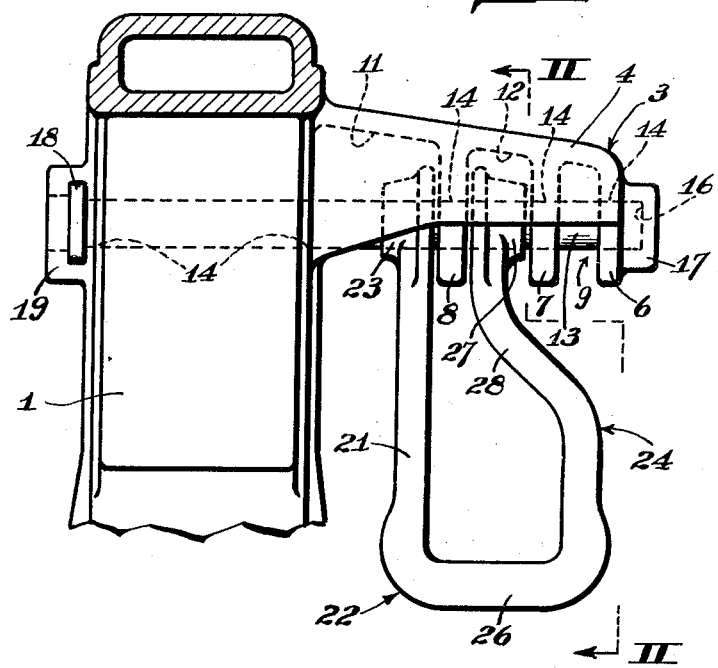
Figure 2:
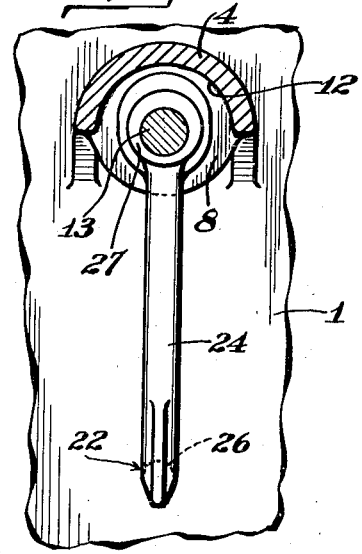

The invention is illustrated in the accompanying drawing in which Fig. 1 is a fragmentary view, partly in section, taken transversely through a side frame of a car truck and showing a bracket with a brake hanger suspended therefrom; and Fig. 2 a view taken on the line II—II of Fig. 1.

Referring to Fig. 1 of the drawing, a side frame 1 of a type of car truck used by railway companies is provided adjacent its top chord with an integral brake hanger bracket 3 projecting laterally therefrom over a car wheel, not shown. The arm 4 of the bracket, as shown in Fig. 2, is semi-circular in cross section, and is provided with three integral lugs 6, 7 and 8 projecting downwardly therefrom at horizontally-spaced intervals with the outermost lug 6 forming the outer end of the bracket.

The center lug 7 is spaced from the outer lug to provide between them a recess 9 intended to receive the bearing eye of the outer side-arm of a U-shape brake hanger. The recess for receiving the bearing eye of the opposite or inner side-arm of a brake hanger is formed at 11 between inner lug 8 and the side of the car truck frame, the necessary length of bracket arm 4 making this recess materially wider than outer recess 9. The distance between recesses 9 and 11 is such that to save metal there are provided two lugs 7 and 8 with a recess 12 between them, the recess 12 being considerably wider than outer recess 9.

A hanger-supporting pin 13 extends through axially-aligned openings 14 in the bracket lugs and side frame 1 with one end of the pin lodged in a socket 16 in a boss 17 integral with outer lug 6. The pin is prevented from moving in the opposite direction by a wedge key 18 driven across its end through side openings in a tubular boss 19 integral with the side of the car truck frame.

As indicated above, bracket 3 was designed to receive the upper ends of a U-shape brake hanger supported by its pin-receiving bearing eyes disposed in outer and inner recesses 9 and 11. Due to the fact that outer recess 9 is substantially no wider than the thickness of the side-arms of a standard brake hanger, the width of the bearing eyes at the upper ends of the side-arms of a U-shape hanger used with hanger brackets of this type has been restricted to substantially the thickness of the arms. The necessary width of the bearing eye surface engaging supporting pin 13 in such cases has been found to be so insufficient that the eyes and pins wear quite rapidly so that the hangers and pins require relatively frequent replacement to avoid their wearing through or breaking, which results in short-lived and unreliable brake beam supports.

In accordance with this invention these difficulties are overcome by making a brake beam support as shown in Fig. 1. The inner side-arm 21 of a brake hanger 22 is straight with a bearing eye 23 integral with its upper end disposed in inner recess 11, and having its lower end integrally connected to the outer arm 24 of the hanger by the usual yoke 26. The outer arm extends upwardly and inwardly towards the inner arm to bring its upper end to center recess 12 so that bearing eye 27, integral with the upper end of side-arm 24, is disposed in the heretofore unused center recess. Preferably, the lower portion of the outer side-arm is disposed directly below outer recess 9, as is customary when U-shape hangers are used, and its upper portion 28 is offset laterally towards truck frame 1 for the purpose just recited. Both of the bearing eyes are pivotally mounted on pin 13 by which the hanger is suspended from bracket 3.

The center recess being considerably wider than the outer recess, the width of bearing eye 27 is materially increased over that possible with a U-shape hanger having the eye of its outer side-arm disposed in the narrow outer recess of the hanger bracket. The width of eye 23 of the inner side-arm is correspondingly increased, and the center of the hanger yoke lies in a plane passing through the medial portion of eye 27. Because these relatively wide pin-receiving eyes have bearing surfaces of increased width and area engaging the supporting pin, the eyes and pin have greatly increased resistance to wear. Accordingly, a brake beam support is provided which is dependable and durable.

According to the provisions of the patent statutes, I have explained the principle of my invention, and have illustrated and described what I now consider to represent its best embodiment. However, I desire to have it understood that, within the scope of the appended claims, the invention may be practiced otherwise than as specifically illustrated and described.

I claim:

1. The combination of a railway car truck frame having a laterally-extending brake hanger bracket provided with three horizontally-spaced depending lugs having aligned pin-receiving openings and forming with each other and the side of the frame three horizontally-spaced recesses the outer of which is the narrowest, a brake hanger comprising two spaced side-arms and a yoke connecting their lower ends, the upper ends of the side-arms having integral pin-receiving bearing eyes positioned in the inner and intermediate of said recesses, the inner arm of said hanger being straight and the outer arm thereof extending upwardly and towards the inner arm and having its bearing eye wider than said outer recess, and a pin extending through said eyes and said lug openings for connecting the hanger to the bracket.

2. The combination of a railway car truck frame having a laterally-extending brake hanger bracket provided with three horizontally-spaced depending lugs having aligned pin-receiving openings and forming with each other and the side of the frame three horizontally-spaced recesses the outer of which is the narrowest, a brake hanger comprising two spaced side-arms and a yoke connecting their lower ends, the upper ends of the side-arms having integral pin-receiving bearing eyes positioned in the inner and intermediate of said recesses and each eye being wider than the outer recess, the inner arm of said hanger being straight and the outer arm thereof having its lower portion disposed substantially below said outer recess and having its upper portion offset toward the inner arm, and a pin extending through said eyes and said lug openings for connecting the hanger to the bracket.

3. The combination of a railway car truck frame having a laterally-extending brake hanger bracket provided with three horizontally-spaced depending lugs having aligned pin-receiving openings and forming with each other and the side of the frame three horizontally-spaced recesses the outer of which is the narrowest, a brake hanger comprising two spaced side-arms and a yoke connecting their lower ends, the upper ends of the side-arms having integral pin-receiving bearing eyes positioned in the inner and intermediate of said recesses, the inner arm of said hanger being straight and the outer arm thereof extending upwardly and towards the inner arm and having its bearing eye wider than said outer recess, the center of the hanger yoke lying in a vertical plane passing through the medial portion of the eye of the outer hanger arm, and a pin extending through said eyes and said lug openings for connecting the hanger to the bracket.

FREDERIC SCHAEFER.